United States Patent
Rubinstein et al.

(10) Patent No.: US 7,324,488 B1
(45) Date of Patent: Jan. 29, 2008

(54) METHOD AND SYSTEM FOR PROVIDING AN INTELLIGENT DATA CONCENTRATOR COMMUNICATIVELY COUPLED TO A NETWORK BY A WIRELESS MODE

(75) Inventors: Alan Rubinstein, Fremont, CA (US); Bhakt Patel, Campbell, CA (US); Gary Wang, Cupertino, CA (US); Yung-Fu Chang, San Jose, CA (US)

(73) Assignee: 3Com Corporation, Marlborough, MA (US)

( * ) Notice: Subject to any disclaimer, the term of this patent is extended or adjusted under 35 U.S.C. 154(b) by 978 days.

(21) Appl. No.: 10/364,049

(22) Filed: Feb. 10, 2003

(51) Int. Cl.
*H04Q 7/24* (2006.01)

(52) U.S. Cl. .................. 370/338; 370/337; 370/434; 370/252; 370/452; 370/466; 370/401; 709/249; 709/223; 709/250; 455/41.2; 455/461; 455/634

(58) Field of Classification Search ............ 370/338, 370/337, 466, 436, 330, 401, 434, 252, 452; 455/464
See application file for complete search history.

(56) References Cited

U.S. PATENT DOCUMENTS

| | | | |
|---|---|---|---|
| 6,192,035 B1 * | 2/2001 | Boggs et al. ............... 370/252 |
| 6,438,585 B2 * | 8/2002 | Mousseau et al. .......... 709/206 |
| 6,490,439 B1 * | 12/2002 | Croft et al. ................ 455/90.1 |
| 6,600,734 B1 * | 7/2003 | Gernert et al. .............. 370/352 |
| 6,757,269 B2 * | 6/2004 | Dorenbosch et al. ....... 370/338 |
| 6,807,437 B1 * | 10/2004 | Andrus et al. ........... 455/575.7 |
| 6,826,387 B1 * | 11/2004 | Kammer .................... 455/41.2 |
| 6,930,987 B1 * | 8/2005 | Fukuda et al. .............. 370/328 |
| 6,950,645 B1 * | 9/2005 | Kammer et al. ......... 455/343.1 |
| 7,023,809 B1 * | 4/2006 | Rubinstein et al. ......... 370/241 |
| 7,143,299 B1 * | 11/2006 | Rubinstein et al. ......... 713/320 |
| 7,149,474 B1 * | 12/2006 | Mikhak .................... 455/41.2 |
| 7,187,924 B2 * | 3/2007 | Ohlenbusch et al. ..... 455/426.1 |

* cited by examiner

*Primary Examiner*—Marceau Milord (57) ABSTRACT

The present invention presents a method and system for providing an intelligent data concentrator communicatively coupled to a network by a wireless mode. Specifically, the present invention comprises a portable intelligent device, communicatively connected to a network by a wireless mode, which may, for example, be placed in the center of a conference table to facilitate a number of client devices connecting for simultaneous access to the network and, at the same time, allowing for ease in moving about the room. In one embodiment, the portable intelligent data concentrator is communicatively coupled by a wireless mode to an access point. In one embodiment, the intelligent data concentrator is battery powered. In one embodiment, the access point through which the intelligent data concentrator is connected to the network is another intelligent data concentrator. In another embodiment, the access point is a Bluetooth access point.

21 Claims, 9 Drawing Sheets

METHOD AND SYSTEM FOR PROVIDING AN INTELLIGENT DATA CONCENTRATOR COMMUNICATIVELY COUPLED TO A NETWORK BY A WIRELESS MODE

RELATED U.S. APPLICATIONS

This application claims priority to the copending provisional patent applications: patent application Ser. No. 60/277,593, entitled "'Intellijack' physical concepts," with filing date Mar. 20, 2001, and assigned to the assignee of the present invention; patent application Ser. No. 60/277,767, entitled "A method for managing intelligent hardware for access to voice and data networks," with filing date Mar. 20, 2001, and assigned to the assignee of the present invention; patent application Ser. No. 60/277,451, entitled "A method for filtering access to voice and data networks by use of intelligent hardware," with filing date Mar. 20, 2001, and assigned to the assignee of the present invention; patent application Ser. No. 60/277,592, "'Intellijack' usage," with filing date Mar. 20, 2001, and assigned to the assignee of the present invention; patent application Ser. No. 60/285,419, "Intelligent concentrator," with filing date Apr. 20, 2001, and assigned to the assignee of the present invention; and patent application Ser. No. 60/301,532, "Intelligent concentrator," with filing date Jun. 26, 2001, and assigned to the assignee of the present invention.

FIELD OF INVENTION

The present invention relates to the field of computer networks. In particular, the present invention relates to a device communicatively coupled to a network by a wireless mode.

BACKGROUND OF THE INVENTION

Modern Local Area Networking (LAN) is generally accomplished by extensive runs of multiple parallel cables to multiple connections and devices at each work site. This is in addition to voice telephone, FAX, and device power cabling. In a large number of work sites, each electronic device connected to the LAN requires its own network cabling. When LAN infrastructures require change, it is very costly to move or add network cabling to support connected devices.

The current state of the art for implementing data multiplexing and Firewall technology, on a per user basis, is centered around providing the capability in a centralized head end data switch or router or by distributing these functions to the end user's location by placing a box level data concentrator switch and security equipment, whether hardware firewall, access control or hardware encryption device, next to the computing equipment that is to be connected to a data LAN.

An intelligent device (e.g., an intelligent data concentrator) for coupling a plurality of electronic devices to a network has been proposed. Typically this intelligent device resides in a wall, is communicatively coupled to the network via cables, and satisfies the need for reliably multiplexing voice, data, FAX and power lines in order to reduce the cost of installation and infrastructure change in a LAN. The intelligent data concentrator also may provide intelligence for aiding in the management of connected networks. A plurality of client devices may be communicatively coupled to the network by plugging into this single intelligent data concentrator.

However, situations may arise wherein it may be difficult or troublesome to connect a plurality of client devices to the aforementioned intelligent device. For example, in the instance where a relatively large number of client devices are being employed in one room, e.g., around a conference table in a conference room, the number of wires may interfere with people moving about the room. Furthermore, the intelligent device may not provide for ease of movement about a room when a number of devices are wired into the device for accessing a network.

There may be instances in which a wall mounted intelligent device may not be easily accessible due to placement of furniture or other equipment. In such instances, a device that may be easily moved to a more convenient location, such as a portable intelligent device, might be desirable.

Accordingly, a need exists for providing an intelligent data device that may be easily moved and that will allow multiple client devices access to one or more networks within a single room, at the same time allowing for ease of movement about the room.

SUMMARY OF THE INVENTION

The present invention presents a method and system for providing an intelligent data concentrator communicatively coupled to a network by a wireless mode. Specifically, the present invention comprises a portable intelligent device, communicatively connected to a network by a wireless mode, which may, for example, be placed in the center of a conference table to facilitate a number of client devices connecting for simultaneous access to the network and, at the same time, allowing for ease in moving about the room. In one embodiment, the portable intelligent data concentrator is communicatively coupled by a wireless mode to an access point. In one embodiment, the intelligent data concentrator is battery powered. In one embodiment, the access point through which the intelligent data concentrator is connected to the network is another intelligent data concentrator. In another embodiment, the access point is a Bluetooth access point.

In one embodiment, the present invention provides an intelligent device for coupling an electronic device to a network comprising a first interface for communicatively coupling, by a wireless mode, the intelligent device to the network, the network comprising at least one network device. The intelligent device also comprises a second interface for communicatively coupling the intelligent device to a plurality of client devices such that the client devices are communicatively coupled to the network. Additionally, the intelligent device comprises processor coupled to the first interface and the second interface and a wireless transceiver for communicatively coupling the first interface the network, coupled to the second interface.

In one embodiment of the present invention, the network device is an access point. In one embodiment, a wireless transceiver is communicatively coupled to the access point by means of a wireless link.

In one embodiment, the access point is a Bluetooth access point and the transceiver is a Bluetooth transceiver. In another embodiment, the access point is a wall-mounted intelligent data concentrator.

In one embodiment, the intelligent device is battery powered. In another embodiment, the intelligent device is powered by a conventional wall socket.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing", "interpreting", "sending", "detecting", "acting", "notifying", "polling", or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Portions of the present invention are comprised of computer-readable and computer executable instructions which reside, for example, in computer-usable media of a computer system. It is appreciated that the present invention can operate within a number of different computer systems including general-purpose computer systems, embedded computer systems, and stand-alone computer systems specially adapted for controlling automatic test equipment.

The present invention provides a device and method for managing network server accessibility detection and client notification. Specifically, the present invention is a device and method for notifying end-users of network server failures. According to one embodiment, the present invention provides an intelligent device (e.g., an intelligent data concentrator) for coupling an electronic device to a network and for providing a polling means coupled to a means for processing and interpreting data and sending messages to the electronic device.

Figure 1:
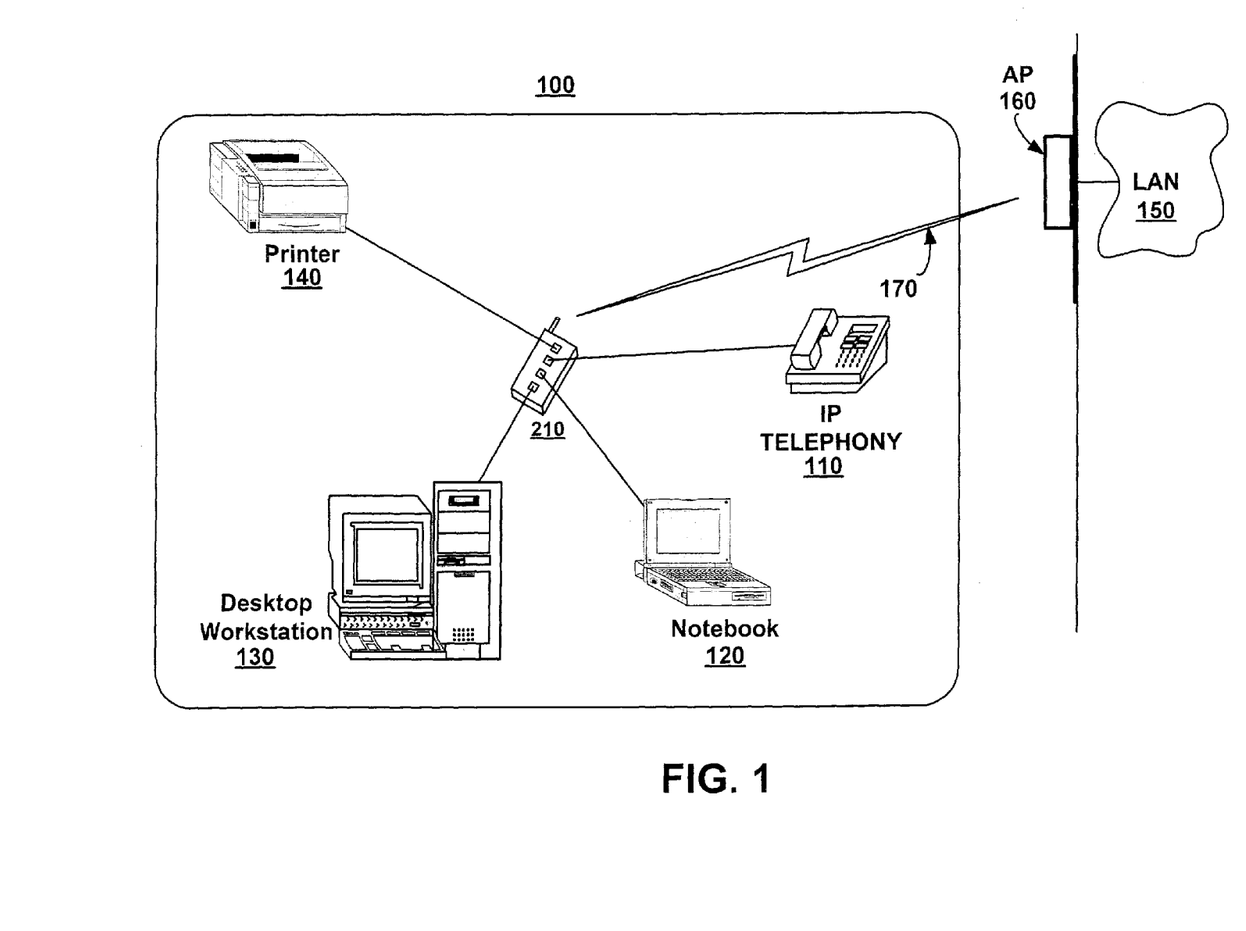
FIG. 1 illustrates an exemplary wired desktop cluster coupled to a local area network (LAN) by a wireless mode in accordance with one embodiment of the present invention.

FIG. 1 illustrates an exemplary personal area network (PAN) 100 coupled to a local area network (LAN) 150 in accordance with one embodiment of the present invention. PAN 100 comprises IP telephony 110, notebook 120, desktop workstation 130 (e.g., a computer system), and printer 140, each of which is coupled to intelligent data concentrator 210. Intelligent data concentrator 210 is communicatively coupled over wireless connection 170 to LAN 150, thus acting as an interface from the various client devices (e.g., comprises IP telephony 110, notebook 120, desktop workstation 130, and printer 140) to LAN 150. The wireless connection 170 to LAN 150 affords ease in moving about a work area comprising PAN 100 without concern for location of wires and/or cables. In one embodiment, wireless connection 170 is communicatively coupled to an access point 160 that is communicatively coupled to LAN 150. In one embodiment, the access point 160 is a Bluetooth device. It should be appreciated that the wireless mode is not limited to a Bluetooth device, and may employ any type of wireless interfaces, including but not limited to ultra wide band (UWB), USB2 wide band or any type of peer-to-peer wireless network. In one embodiment the access point 160 is another intelligent data concentrator 210 which has a wired connection to LAN 150.

Figure 2A:
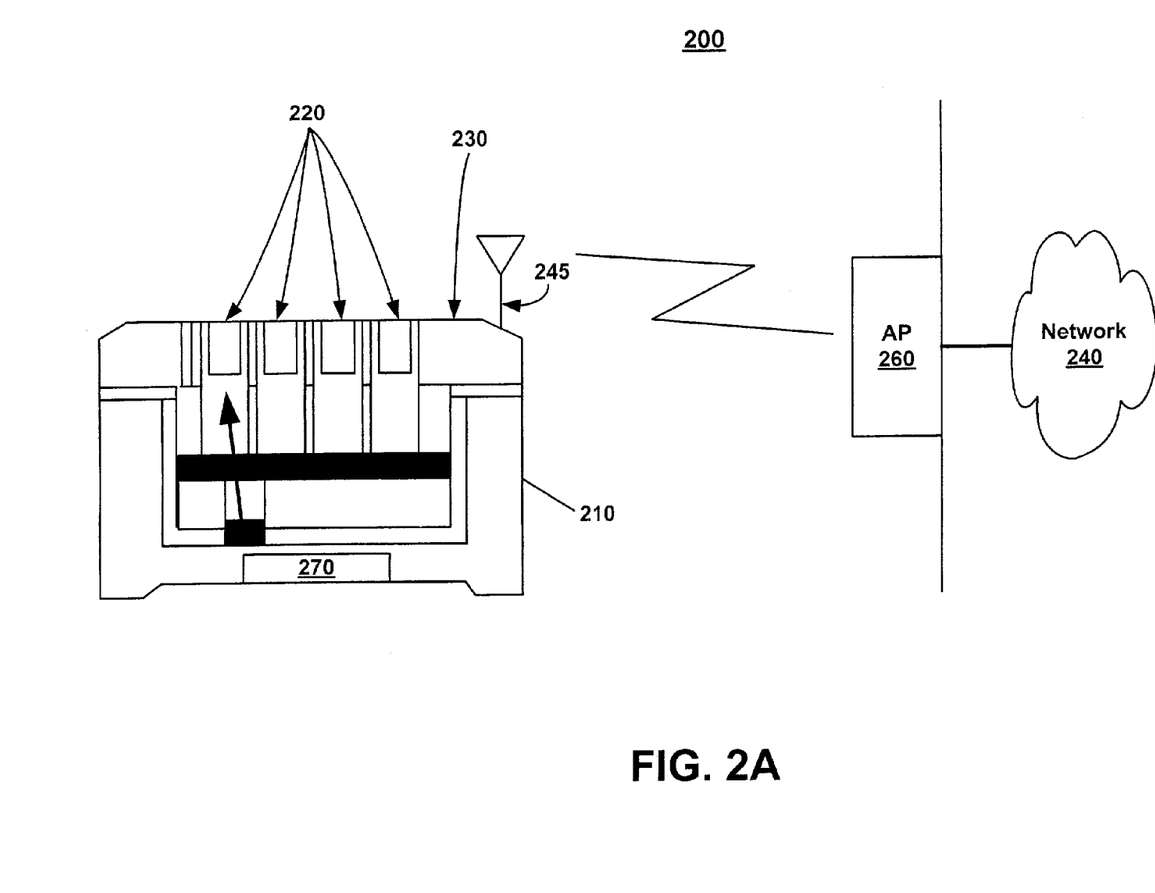
FIG. 2A is a block diagram of a cross-sectional view of a portable intelligent data concentrator with an internal power source in accordance with one embodiment of the present invention.

FIG. 2A is a block diagram of a cross-sectional view of an intelligent data concentrator 210 in accordance with one embodiment of the present invention. One embodiment of the present invention implements intelligent hardware that is easy to install and reliably provides an antenna for wireless access to network 240, implemented through an access point 260 provided for in an office cubicle or conference room. An external surface 230 of intelligent data concentrator 210 is intended to be accessible by the end user and would in most instances be easily accessed on desk or table top surface of a workspace or conference room. According to one embodiment, network 240 is a data network. In another embodiment, network 240 is a voice network.

Referring still to FIG. 2A, a plurality of standard communications ports 220 is mounted on external surface 230 of the present embodiment for access by client devices. In one embodiment, communication port 220 is an RJ-45 jack. In another embodiment, communication port 220 is an RJ-11 jack. It should be appreciated that communication port 220 is not limited to any particular jack, and that any type or combination of types of communication port(s) can be used. Additionally, while intelligent data concentrator 210 illustrates four communication ports 220, it should be appreciated that alternative implementations could support a greater or lesser number of communication ports 220.

Connections to network 240 are terminated at access point 260 from which communication is wirelessly coupled to intelligent data concentrator 210 via a means for transmitting and receiving data 245. Means for transmitting and receiving data 245 may include, but not be limited to: an antenna, a wireless transceiver, a wireless receiver, a wireless transmitter and Bluetooth transceiver. Access point 260 may be, but should not be limited to, a Bluetooth, 802.11, or infrared (IR) device, or it may be an in-wall intelligent data concentrator.

Still referring to FIG. 2A, in addition to wired connections to and from intelligent data concentrator 210 and the client devices, wireless connectivity is a viable method. Infrared (IR), Bluetooth, 802.11 or other means could be utilized by the client devices to communicate with the device.

In one embodiment, power for intelligent data concentrator 210 is provided by internal power source 270. The present embodiment is also able to forward power to data devices that are connected to communications ports 220 on user accessible surface 230.

Figure 2B:
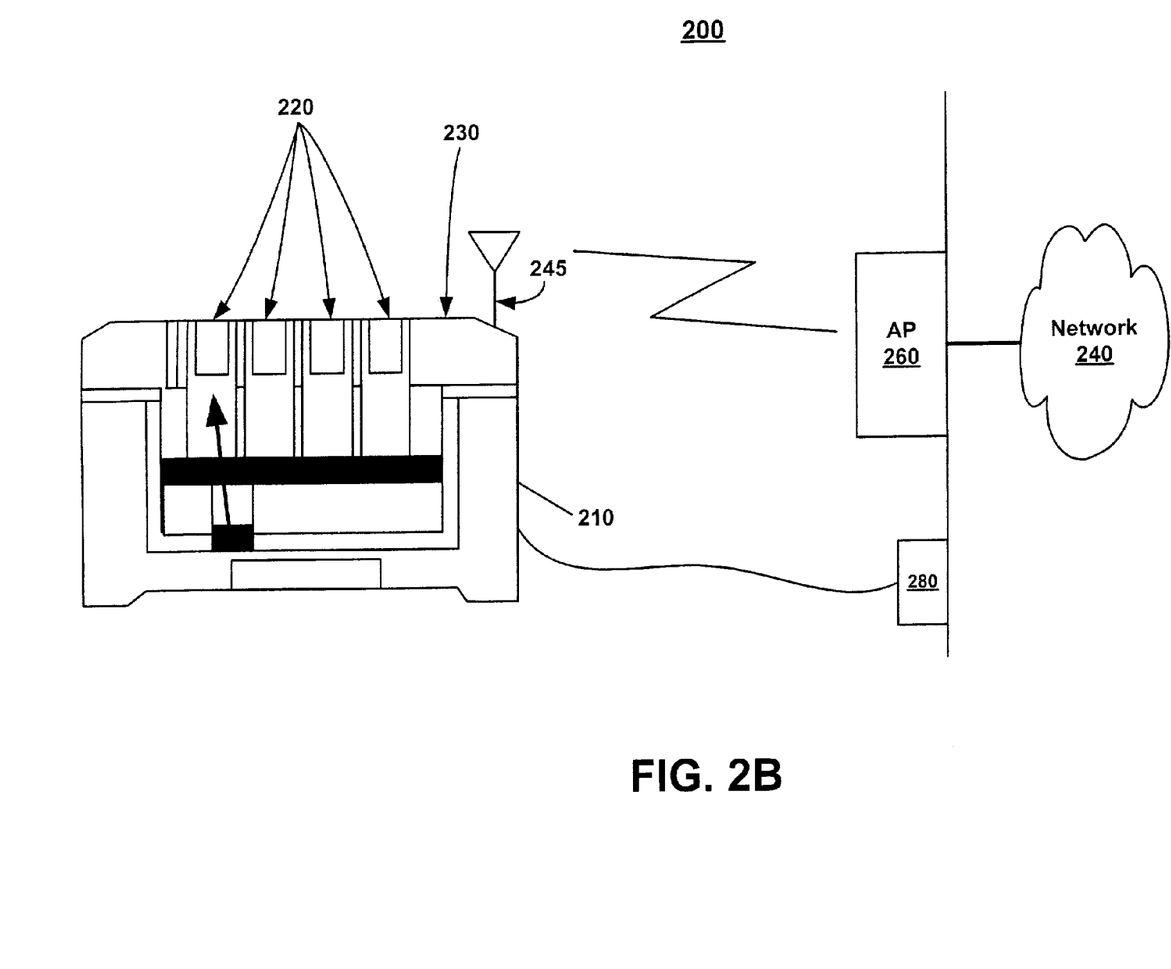
FIG. 2B is a block diagram of a cross-sectional view of a portable intelligent data concentrator with an external power source in accordance with one embodiment of the present invention.

FIG. 2B shows intelligent data concentrator 210 connected to external power source 280, according to one embodiment. In this embodiment, power for intelligent data concentrator 210, as well as devices connected to it, is provided from external power source 280. External power source may be any means of providing power to intelligent data concentrator 210, including but not limited to a Universal Serial Bus (USB) and a PCMCIA card.

Figure 3:
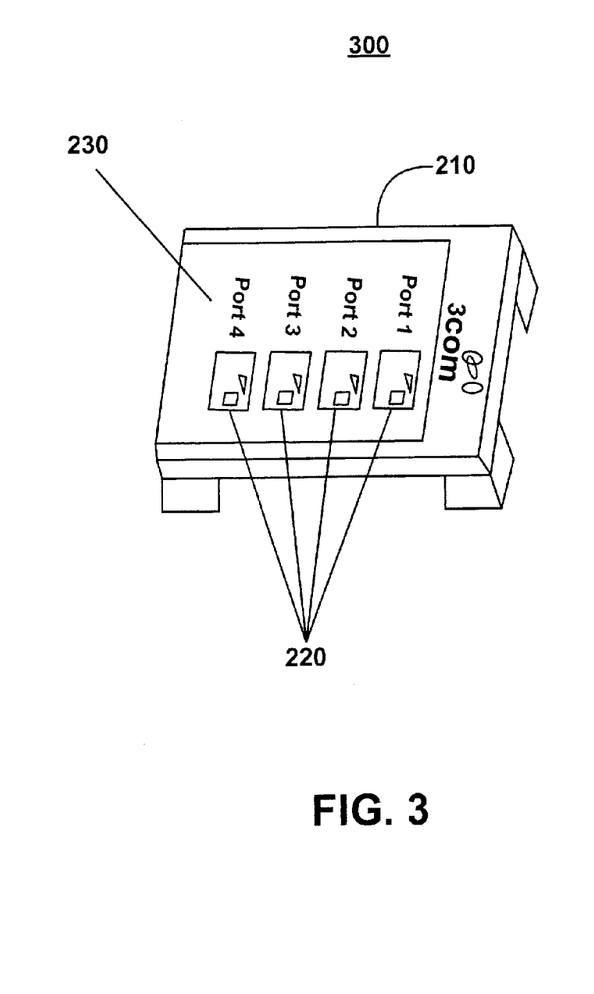
FIG. 3 is an illustration of a perspective view of an exemplary faceplate of a portable intelligent data concentrator in accordance with one embodiment of the present invention.

FIG. 3 is an illustration of a perspective view 300 of an exemplary user-accessible external surface 230 of an intelligent data concentrator 210 in accordance with one embodiment of the present invention. A user is able to connect data devices to a voice or data network through communications ports 220.

Figure 4:
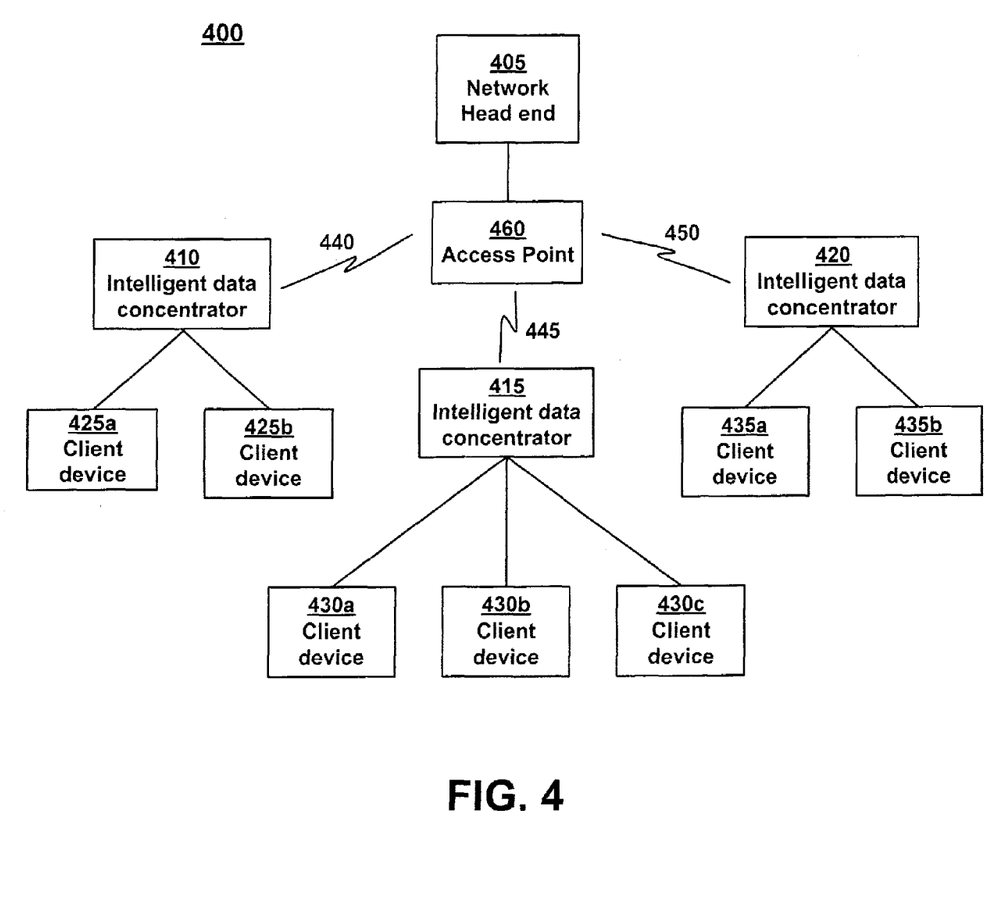
FIG. 4 is a block diagram of an exemplary LAN upon which embodiments of the present invention may be practiced.

FIG. 4 is a block diagram of an exemplary LAN 400 upon which embodiments of the present invention may be practiced. LAN 400 comprises a network head end 405, an access point 460, and intelligent devices 410, 415, and 420. In one embodiment, intelligent devices 410, 415 and 420 are intelligent data concentrators (e.g., intelligent data concentrator 210 of FIG. 2). In one embodiment, network head end 405 is a central control site that can access the intelligence of intelligent devices 410, 415, and 420 via access point 460. In another embodiment, network head end 405 is a central data switch or hub. Intelligent devices 410, 415, and 420 are communicatively coupled to network 405 over wireless links 440, 445, and 450, respectively. In one embodiment, links 440, 445, and 450 are Bluetooth connections. In another embodiment, links 440, 445 and 450 are IEEE standard 802.11 connections. It should be appreciated that links 440, 445 and 450 may be any appropriate wireless connection.

Intelligent device 410 is coupled to client devices 425*a* and 425*b*. Similarly, intelligent device 415 is coupled to client devices 430*a*, 430*b* and 430*c*, and intelligent device 420 is coupled to client devices 435*a* and 435*b*. It should be appreciated that client devices can comprise any number of data devices, including but not limited to: computer systems, printers, voice IP telephones, and fax machines configured for use over voice IP networks.

Figure 5:
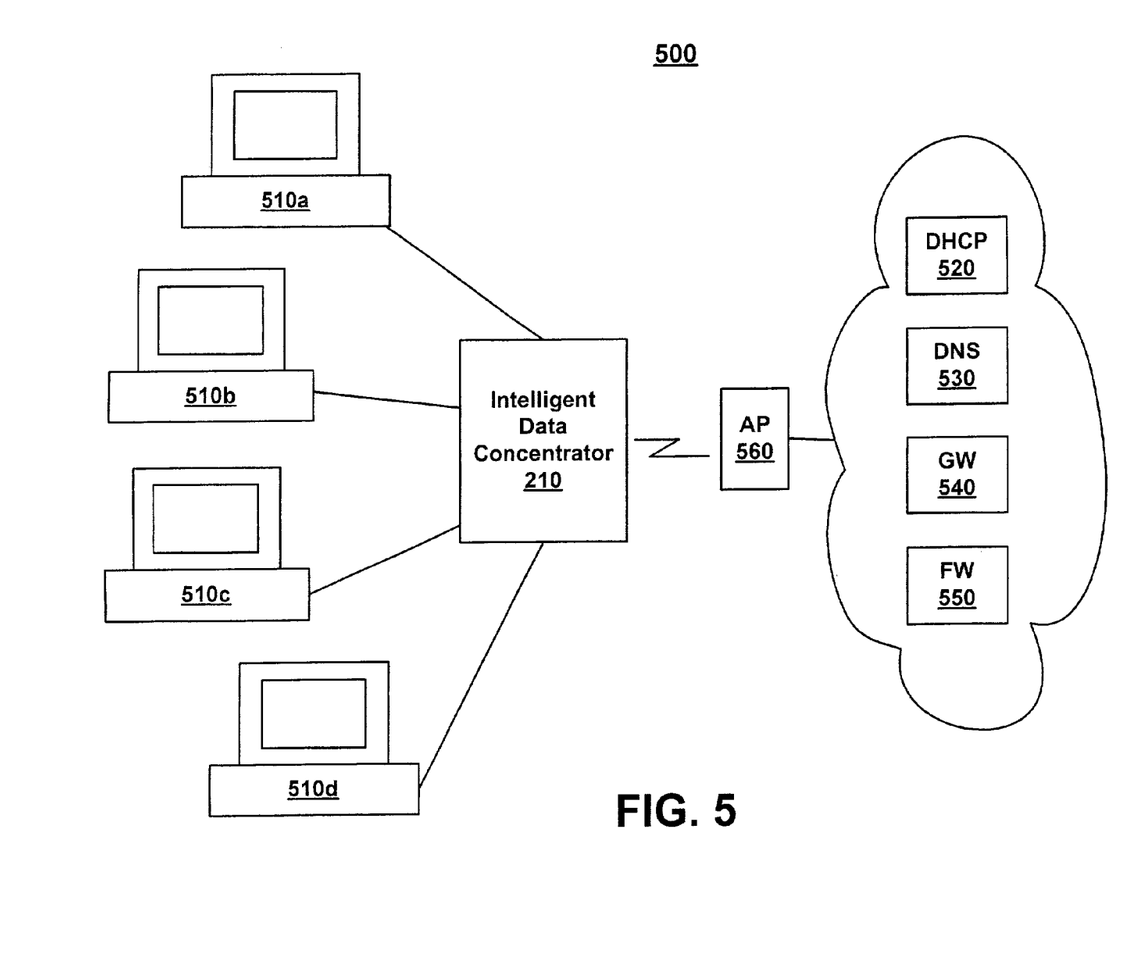
FIG. 5 is a block diagram of an intelligent data concentrator within an exemplary LAN in accordance with an embodiment of the present invention.

FIG. 5 is a block diagram of an intelligent data concentrator 210 within an exemplary LAN in accordance with an embodiment of the present invention. Network 500, in accordance with the present embodiment, comprises a DHCP server 520, a DNS server 530, a gateway server 540 and a firewall server 550 and is communicatively coupled to the intelligent data concentrator 210 via wireless access point 560. Client devices 510*a*, 510*b*, 510*c*, and 510*d* are, according to the present embodiment, are also communicatively coupled to the intelligent data concentrator 210. Thus, intelligent data concentrator 210 may communicate with all client devices 510*a*, 510*b*, 510*c* and 510*d*, and with DHCP 520, DNS 530, GW 540 and FW 550.

In one embodiment, as shown in FIG. 5, intelligent data concentrator 210 sends a polling signal to servers 520, 530, 540 and 550 on a predetermined periodic basis. This polling signal may be in the form of, but not limited to, a ping, an Address Resolution Protocol (ARP) message, an Internet Control Message Protocol (ICMP) message, a Simple Network Management Protocol message or any messaging protocol appropriate for polling the accessibility of server devices. Provided all servers 520, 530, 540 and 550 are accessible there is no notification sent to client devices 510*a-d*. It is understood that the servers are not limited to the number or type exemplified in FIG. 5, but may include any number and classification of server devices as comprise a network.

Figure 6:
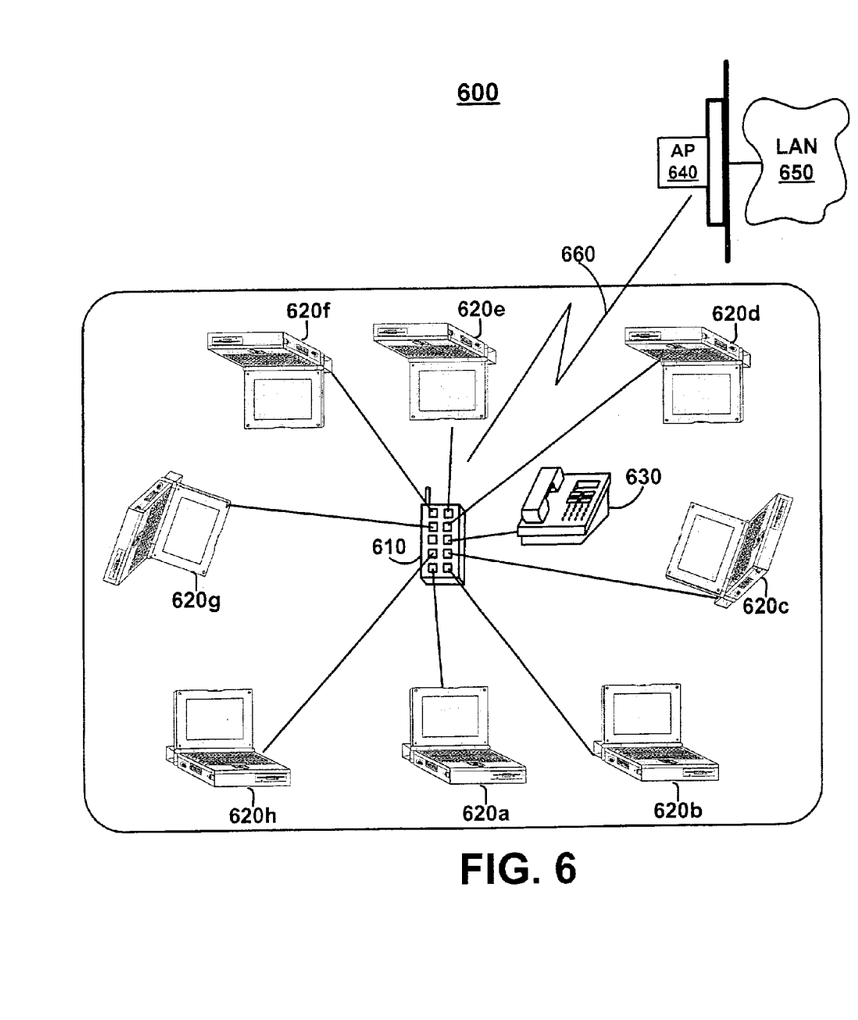
FIG. 6 illustrates an exemplary conference room cluster coupled to a local area network (LAN) by a wireless mode in accordance with one embodiment of the present invention.

FIG. 6 illustrates an exemplary conference room 600 with a cluster of client devices 610 and 620*a-h* communicatively coupled to a local area network (LAN) 650 by a portable intelligent data concentrator 610 through a wireless mode, in accordance with one embodiment of the present invention. The wireless coupling 660 of the intelligent data concentrator 610 to the LAN 650 affords ease in moving about conference room 600 without concern for location of wires and/or cables. In one embodiment, the wireless mode may be via an access point 640 which is coupled to LAN 650. In one embodiment, the access point 640 may be a Bluetooth device. In one embodiment the access point 640 may be another intelligent data concentrator 610 which has a wired connection to LAN 650. It should be appreciated that the wireless mode may employ any type of wireless interface.

Figure 7:
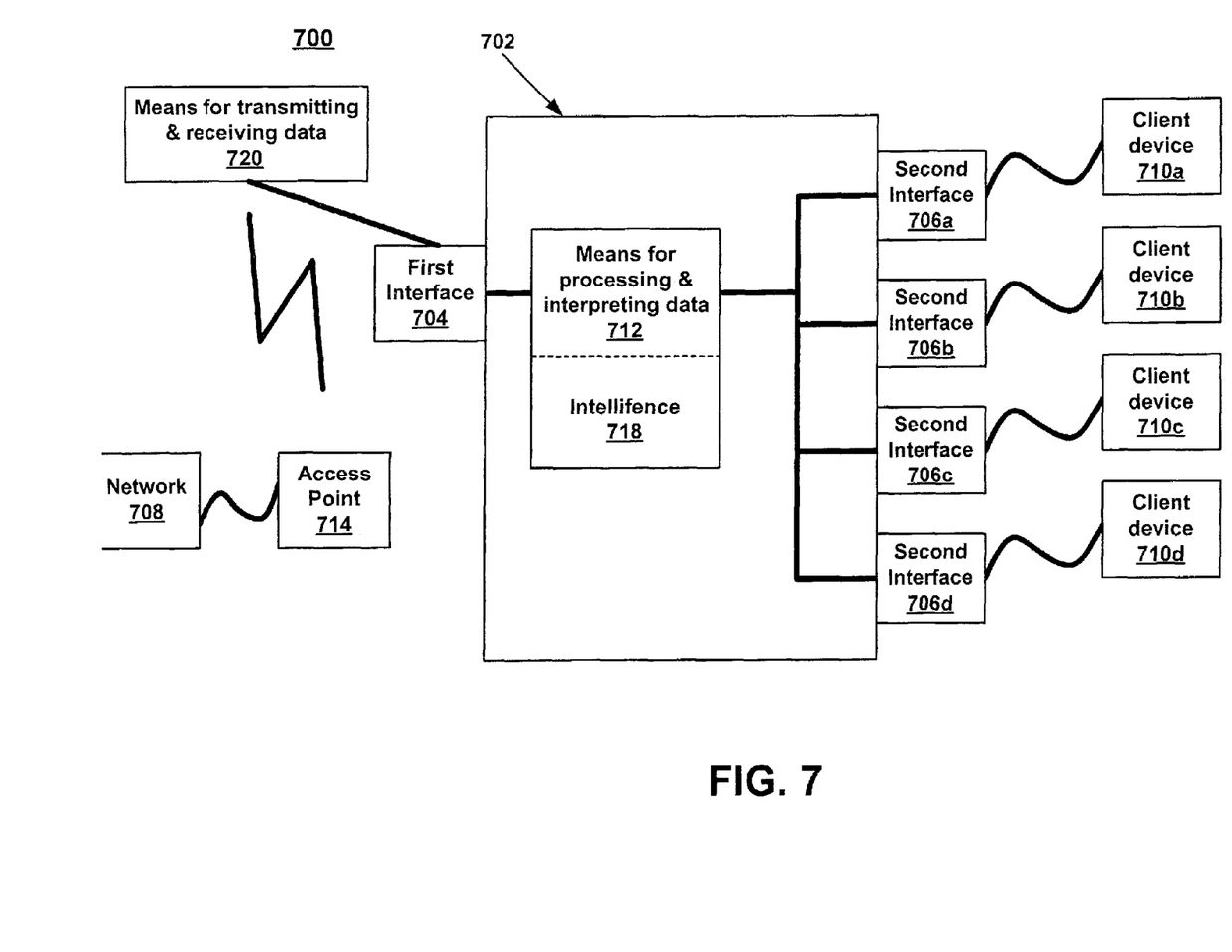
FIG. 7 is a block diagram of an intelligent data concentrator configured for communicatively coupling a plurality of client devices to a network by wireless means in accordance with one embodiment of the present invention.

FIG. 7 is a block diagram 700 of an intelligent data concentrator configured for communicatively coupling a plurality of client devices to a network by wireless means.

Intelligent data concentrator 702 comprises a first interface 704 for communicatively coupling intelligent data concentrator 702 to access point 714 by wireless means for coupling to network 708. Intelligent data concentrator 702 also comprises a plurality of second interfaces 706*a-d* for communicatively coupling intelligent data concentrator 702 to a plurality of client devices 710*a-d*. In one embodiment, second interfaces 706*a-d* are communication ports (e.g., communication ports 220 of FIG. 2). It should be appreciated that there can be any number of second interfaces 706*a-d*, and that the present invention is not meant to limit the number of second interfaces 706*a-d*. First interface 704 operating in conjunction with second interfaces 706*a-d* operates to connect client devices 710*a-d* to network 708. In one embodiment, first interface 704 may be a Bluetooth transceiver. In another embodiment, first interface 704 may be a 802.11 transceiver. It should be understood that first interface 704 may be any transmitting/receiving device compatible with access point 714. Wireless access point may be a Bluetooth device in one embodiment, a 802.11 device in another embodiment and a wall-mounted intelligent device in yet another embodiment. It should be appreciated that the access point is not limited to the aforementioned devices, and any device providing wireless means for communicatively coupling the intelligent data concentrator 702 with network 708 may be employed.

Intelligent data concentrator 702 also comprises means for processing and interpreting data 712 coupled to the first interface 704 and intelligence 718 coupled to the means for processing and interpreting data 712. Means for processing and interpreting data 712 is intended to include, but not limited to: a processor, input/output devices and memory.

Intelligence 718 may include, but not be limited to, a fault detection means, a polling means, a client device notification means and any number of functional means as may be required for the device application and supplied by software implementation or hardware design.

Intelligent data concentrator 702 also comprises means for transmitting and receiving data 720 coupled to the first interface 704. Means for transmitting and receiving data 720 is intended to include, but not limited to: an antenna, a wireless transceiver, a wireless receiver, a wireless transmitter and a Bluetooth transceiver.

Figure 8:
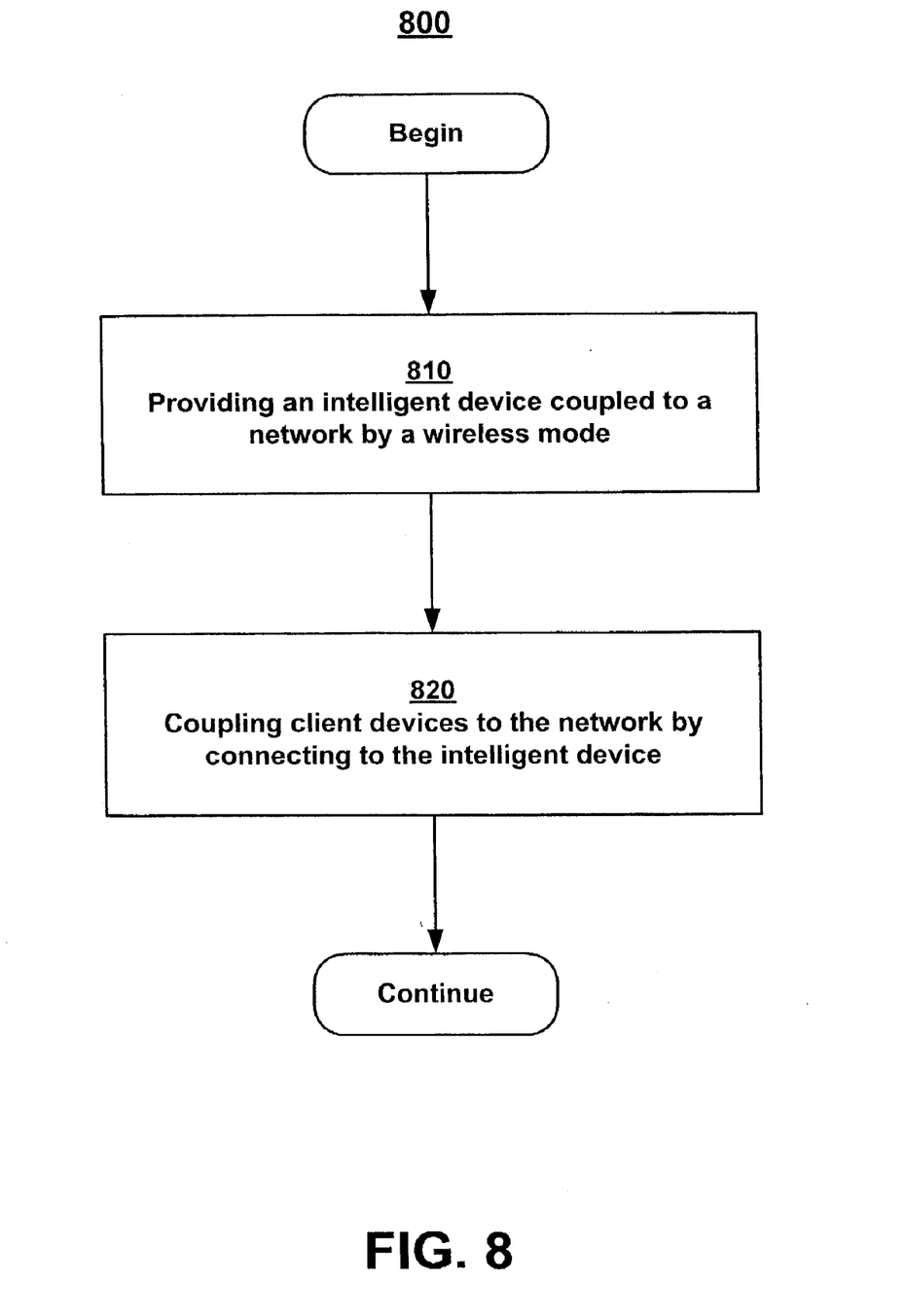
FIG. 8 is a flowchart of the steps in a process for achieving network server access in accordance with an embodiment of the present invention.

FIG. 8 is a flowchart 800 of the steps in a process for providing network access to a number and variety of client devices by a wireless means, in accordance with one embodiment of the present invention. At step 810, an intelligent device coupled to a network by a wireless is provided. The intelligent device comprises a first interface for communicatively coupling the intelligent device to a network by a wireless mode. In one embodiment the intelligent device is an intelligent data concentrator (e.g., intelligent data concentrator 702 of FIG. 7).

In one embodiment, the wireless mode is via an access point in the vicinity of the intelligent device. In one embodiment the access point is a Bluetooth access point. In one embodiment the access point is an IEEE standard 802.11 access point. In another embodiment the access point is an intelligent data concentrator.

At step 820 of process 800, network access by means of an intelligent device is provided for a number of client devices. The intelligent device comprises a second interface for communicatively coupling the intelligent device to a plurality of client devices. In one embodiment the second interface comprises a plurality of jacks mounted on an accessible face of the intelligent device, to which a plurality of client devices may be connected.

Embodiments of the present invention, a method and system for providing an intelligent data concentrator communicatively coupled to a network by a wireless mode, is thus described. While the present invention has been described in particular embodiments, it should be appreciated that the present invention should not be construed as limited by such embodiments, but rather construed according to the below claims.

What is claimed is:

1. An intelligent data concentrator for coupling a plurality of electronic client devices to a network, comprising:
    a first interface for communicatively coupling said intelligent data concentrator to said network by a wireless mode, said network comprising at least one network device;
    a second interface including a plurality of communication ports for communicatively coupling said intelligent data concentrator to each of a plurality of client devices by a direct wired connection such that each of said client devices is communicatively coupled to said network;
    a processor coupled to said first interface and said second interface; and
    a wireless transceiver for communicatively coupling said first interface to said network, said wireless transceiver coupled to said first interface.

2. An intelligent data concentrator as recited in claim 1 wherein said network device is an access point.

3. An intelligent data concentrator as recited in claim 2 wherein said wireless transceiver is communicatively coupled to said access point by a wireless mode.

4. An intelligent data concentrator as recited in claim 3 wherein said access point is a Bluetooth access point and said wireless transceiver is a Bluetooth transceiver.

5. An intelligent data concentrator as recited in claim 3 wherein said access point is a wall-mounted intelligent data concentrator.

6. An intelligent data concentrator as recited in claim 1 further comprising:
    an internal power source.

7. An intelligent data concentrator as recited in claim 1 further comprising:
    an external power source.

8. An intelligent data concentrator comprising:
    a first interface providing a means for communicatively coupling said intelligent data concentrator to said network by a wireless mode, said network comprising at least one network device;
    a second interface providing a means for communicatively coupling said intelligent data concentrator directly to each of a plurality of client devices via a wired connection such that said client devices are communicatively coupled to said network;
    a means for processing and interpreting data coupled to said first interface and said second interface; and
    a means for transmitting and receiving data for communicatively coupling said first interface to said network, said means for transmitting and receiving coupled to said first interface.

9. An intelligent data concentrator as recited in claim 8 wherein said network device is an access point.

10. An intelligent data concentrator as recited in claim 9 wherein said wireless transceiver is communicatively coupled to said access point by a wireless mode.

11. An intelligent data concentrator as recited in claim 10 wherein said access point is a Bluetooth access point and said wireless transceiver is a Bluetooth transceiver.

12. An intelligent data concentrator as recited in claim 10 wherein said access point is a wall-mounted intelligent data concentrator.

13. An intelligent data concentrator as recited in claim 8 further comprising:
    an internal power source.

14. An intelligent data concentrator as recited in claim 8 further comprising:
    an external power source.

15. A method for accessing a network comprising:
  a) providing an intelligent data concentrator comprising:
    a first interface for communicatively coupling said intelligent data concentrator to said network by a wireless mode, said network comprising at least one network device;
    a second interface including a plurality communication ports for communicatively coupling said intelligent data concentrator to each of a plurality of client devices by a direct wired connection such that each of said client devices are communicatively coupled to said network;
    a processor coupled to said first interface and said second interface; and
    a wireless transceiver, coupled to said first interface, for communicatively coupling said first interface to said network; and
  b) coupling said intelligent data concentrator to said network by a wireless mode.

16. The method of claim 15 wherein said network device is an access point.

17. The method of claim 16 wherein said wireless transceiver is communicatively coupled to said access point by a wireless mode.

18. The method of claim 17 wherein said access point is a Bluetooth access point and said wireless transceiver is a Bluetooth transceiver.

19. The method of claim 17 wherein said access point is a wall-mounted intelligent data concentrator.

20. The method of claim 15 wherein said intelligent data concentrator is powered by an internal power source.

21. The method of claim 15 wherein said intelligent data concentrator is powered by an external power source.

* * * * *